United States Patent
Lee et al.

(10) Patent No.: US 9,372,358 B2
(45) Date of Patent: Jun. 21, 2016

(54) LIQUID CRYSTAL DISPLAY DEVICE

(71) Applicant: LG Display Co., Ltd., Seoul (KR)

(72) Inventors: Yong Seok Lee, Paju-si (KR); Choun Sung Kang, Goyang-si (KR); Yong Ik Hwang, Paju-si (KR); Hee Kyung Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/873,063

(22) Filed: Oct. 1, 2015

(65) Prior Publication Data

US 2016/0026031 A1    Jan. 28, 2016

Related U.S. Application Data

(63) Continuation of application No. 14/107,754, filed on Dec. 16, 2013, now Pat. No. 9,182,535.

(30) Foreign Application Priority Data

Jan. 24, 2013 (KR) .................... 10-2013-0007857

(51) Int. Cl.
    *G02F 1/1335* (2006.01)
    *G02F 1/1333* (2006.01)
    *F21V 8/00* (2006.01)

(52) U.S. Cl.
    CPC ........ *G02F 1/133308* (2013.01); *G02B 6/0073* (2013.01); *G02B 6/0088* (2013.01); *G02F 1/133528* (2013.01); *G02F 1/133615* (2013.01);
    (Continued)

(58) Field of Classification Search
    CPC ............ G02B 6/0056; G02F 1/133615; G02F 1/3362

USPC ................................................. 349/58, 61, 65
See application file for complete search history.

(56) References Cited

U.S. PATENT DOCUMENTS 7,978,286 B2 *  7/2011  Kono .................... G02B 6/009
                                                         349/56
2007/0132909 A1  6/2007  Oohira
(Continued)

FOREIGN PATENT DOCUMENTS

EP      2520968 A1    11/2012
JP      04-213425 A    8/1992
(Continued)

OTHER PUBLICATIONS

Office Action for Japanese Patent Application No. JP 2013-260164, Apr. 14, 2015, 10 Pages.
(Continued)

*Primary Examiner* — Lucy Chien
(74) *Attorney, Agent, or Firm* — Fenwick & West LLP

(57) ABSTRACT

Disclosed is an LCD device with reduced thickness and bezel width. The LCD device includes a liquid crystal display panel configured to include an upper substrate and a lower substrate that are facing-coupled to each other, a backlight unit configured to include a light guide plate which irradiates light incident from a light source module on the liquid crystal display panel and an optical sheet disposed on the light guide plate, and a coupling member configured to couple the liquid crystal display panel to the light guide plate with the optical sheet therebetween such that a sealed space is provided between the liquid crystal display panel and the light guide plate.

17 Claims, 7 Drawing Sheets

(52) U.S. Cl.
CPC .............. *G02F 2001/133311* (2013.01); *G02F 2001/133314* (2013.01); *G02F 2202/28* (2013.01)

(56) References Cited

U.S. PATENT DOCUMENTS

| | | |
|---|---|---|
| 2007/0139583 A1 | 6/2007 | Meijers et al. |
| 2007/0222917 A1 | 9/2007 | Ono |
| 2008/0055925 A1 | 3/2008 | Masamoto et al. |
| 2010/0165232 A1 | 7/2010 | Park et al. |
| 2011/0043721 A1 | 2/2011 | Hwang et al. |
| 2012/0140521 A1 | 6/2012 | Kao et al. |
| 2012/0281383 A1 | 11/2012 | Hwang et al. |
| 2012/0307176 A1 | 12/2012 | Tanaka |

FOREIGN PATENT DOCUMENTS

| | | |
|---|---|---|
| JP | 09-318940 A | 12/1997 |
| JP | 11-174417 A | 7/1999 |
| JP | 2007-232809 A | 9/2007 |
| JP | 2007305456 A | 11/2007 |
| JP | 2010-282006 A | 12/2010 |
| JP | 2012118498 A | 6/2012 |
| JP | 2012-159695 A | 8/2012 |
| KR | 20060110169 A | 10/2006 |
| KR | 20070061449 A | 6/2007 |
| WO | WO 2012/081395 A | 6/2012 |

OTHER PUBLICATIONS

Office Action for U.S. Appl. No. 14/107,754, Feb. 20, 2015, 9 Pages.

\* cited by examiner

LIQUID CRYSTAL DISPLAY DEVICE

CROSS-REFERENCE TO RELATED APPLICATIONS

This application is a continuation application of U.S. patent application Ser. No. 14/107,754 filed on Dec. 16, 2013, which claims priority to Korean Patent Application No. 10-2013-0007857 filed on Jan. 24, 2013, which are incorporated by reference herein in their entirety.

BACKGROUND

1. Field of the Invention

The present invention relates to a liquid crystal display (LCD) device, and more particularly, to an LCD device with reduced thickness and bezel width.

2. Discussion of the Related Art

LCD devices display an image by using thin film transistors (TFTs) as switching elements. The LCD devices are widely used as display devices for notebook computers, tablet computers, smartphones, portable display devices, and various portable information devices, in addition to televisions or monitors. Since the LCD devices cannot self-emit light, the LCD devices display an image by using light emitted from a backlight unit which is disposed under a liquid crystal display panel.

FIG. 1 is a cross-sectional view schematically illustrating a portion of a general LCD device.

Referring to FIG. 1, the general LCD device includes a liquid crystal display panel 10, a backlight unit 20, a lower case 30, a guide panel 40, and an upper case 50.

The liquid crystal display panel 10 includes a lower substrate 12 and an upper substrate 14 which are coupled to each other with a liquid crystal layer therebetween, and displays an image by using light emitted from the backlight unit 20. Polarizing films 16 and 18 are adhered to a bottom and top of the liquid crystal display panel 10, respectively.

The backlight unit 20 is disposed under the liquid crystal display panel 10, and irradiates light on the bottom of the liquid crystal display panel 10. The backlight unit 20 includes: a reflective sheet 21 that is disposed at the lower caser 30; a light source module 23 that is disposed at one side of the lower case 30, and emits light; a light guide plate 25 that is disposed on the reflective sheet 21, and guides light, which is incident from the light source module 23 onto a light input part, toward the liquid crystal display panel 10; a plurality of optical sheets 27 that are disposed on the light guide panel 25, and enhance a luminance characteristic of light traveling from the light guide plate 25 to the liquid crystal display panel 10; and a light source housing 29 that supports the light source module 23.

The light source module 23 includes a light emitting diode (LED) array board 23a and a plurality of LED packages 23b. The LED array board 23a is disposed at a side wall of the light source housing 29 to face the light input part of the light guide plate 25. A plurality of driving power lines, which respectively supply driving power to the plurality of LED packages 23b, are formed at the LED array board 23a.

The plurality of LED packages 23b are mounted at certain intervals on the LED array board 23a, and emit light with the driving power supplied from the respective driving power lines to irradiate the light having certain luminance on the light input part of the light guide plate 25. The light emitted from the plurality of LED packages 23b is incident on the light input part of the light guide plate 25, is reflected from and refracted inside the light guide plate 25, and is irradiated on the liquid crystal display panel 10 through the plurality of optical sheets 27 along with light reflected by the reflective sheet 21.

The lower case 30 is provided to have an accommodating space. The lower case 30 accommodates the backlight unit 20, and supports the guide panel 40.

The guide panel 40 is provided in a tetragonal band shape to the support a bottom edge portion of the liquid crystal display panel 10. The guide panel 40 includes a panel supporting part, which supports the bottom edge portion of the liquid crystal display panel 10, and a guide side wall that is formed vertically to the panel supporting part and surrounds all side walls of the backlight unit 20.

The upper case 50 is provided in a tetragonal band shape in order for one side of the upper case 50 to have a ㄷ-shape, and surrounds a top edge portion of the liquid crystal display panel 10 and all side surfaces of the guide panel 40.

As described above, the general LCD device includes a certain gap G that is provided between the bottom of the liquid crystal display panel 10 and a top of the optical sheet 27. This, as illustrated in FIGS. 2 and 3, is for preventing mura from occurring due to interference between elements caused by a bending or twist of the liquid crystal display panel 10, the light guide plate 25, and the optical sheet 27. In particular, the mura mainly occurs due to a contact between the optical sheets 27 and the liquid crystal display panel 10 when moisture penetrates into the gap G at an environment of high temperature and humidity.

In order to prevent the mura, the optical sheet 27 and the liquid crystal display panel 10 should be separated from each other by an interval of 1.5 mm to 2 mm, in which case a thickness T of the LCD device increases due to the gap G between the optical sheet 27 and the liquid crystal display panel 10.

Moreover, in the general LCD device, the guide panel 40 maintains a constant interval between the optical sheet 27 and the liquid crystal display panel 10 and supports the liquid crystal display panel 10, and the upper case 50 covers the top edge portion of the liquid crystal display panel 10. Therefore, a bezel width W increases due to the guide panel 40 and the upper case 50.

For this reason, the general LCD device has a limitation in reducing the thickness T and bezel width W thereof.

SUMMARY

Accordingly, the present invention is directed to provide an LCD device that substantially obviates one or more problems due to limitations and disadvantages of the related art.

An aspect of the present invention is directed to provide an LCD device with reduced thickness and bezel width.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: a liquid crystal display panel configured to include an upper substrate and a lower substrate that are coupled to face each other; a backlight unit configured to include a light guide plate, which irradiates light incident from a light source module on the liquid crystal display panel, and an optical sheet disposed on the light guide plate; and a coupling member configured to couple the liquid crystal display panel to the light guide plate with the optical sheet therebetween such that a sealed space is provided between the liquid crystal display panel and the light guide plate.

The liquid crystal display panel may further include a lower polarizing member adhered to the lower substrate to surface-contact an entire area of a top of the optical sheet in the sealed space, and the coupling member may be provided between the lower substrate and the light guide plate.

The coupling member may include: a bank provided at a top of the light guide plate to be separated from each of side surfaces of the light guide plate and to have a certain height, and configured to support the liquid crystal display panel; and a sealing member provided in a facing space between the liquid crystal display panel and an edge portion of the light guide plate which is an outer portion of the bank, and configured to couple the liquid crystal display panel to the light guide plate and seal the outer portion of the bank.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Hereinafter, embodiments of an LCD device according to the present invention will be described in detail with reference to the accompanying drawings.

Figure 1:
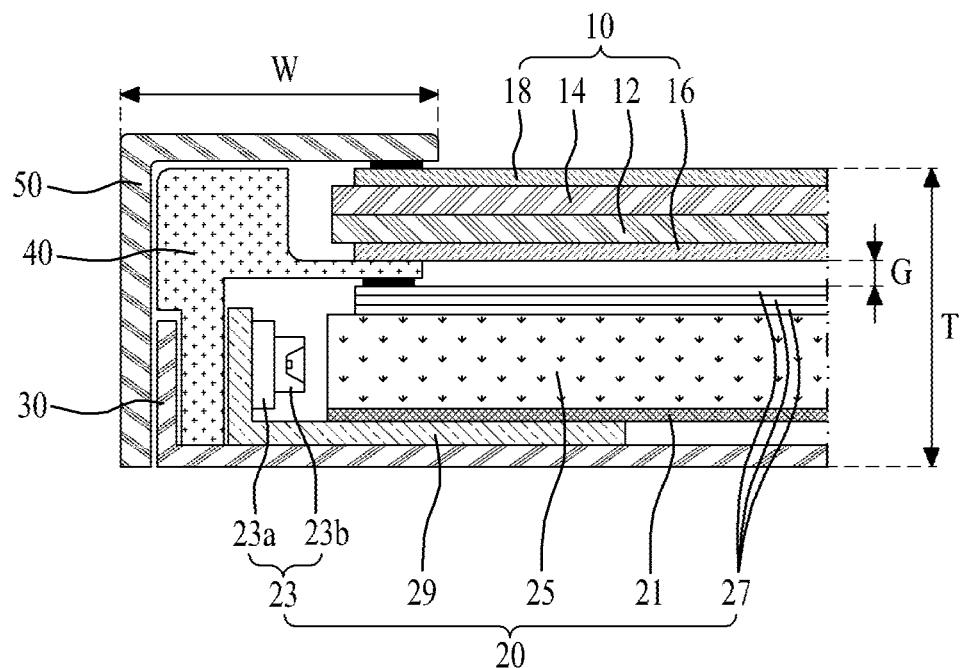
FIG. 1 is a cross-sectional view schematically illustrating a portion of a general LCD device.
Figure 2:
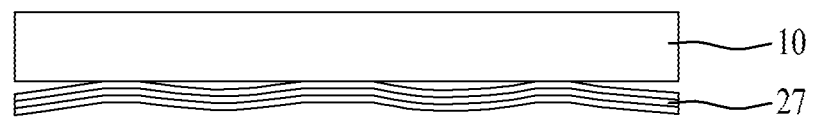
FIGS. 2 and 3 are views for describing mura which occur due to interference between elements in the general LCD device.
Figure 3:
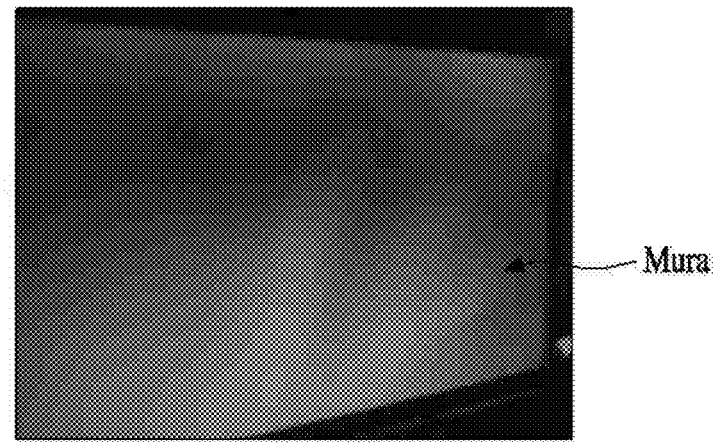
Figure 4:
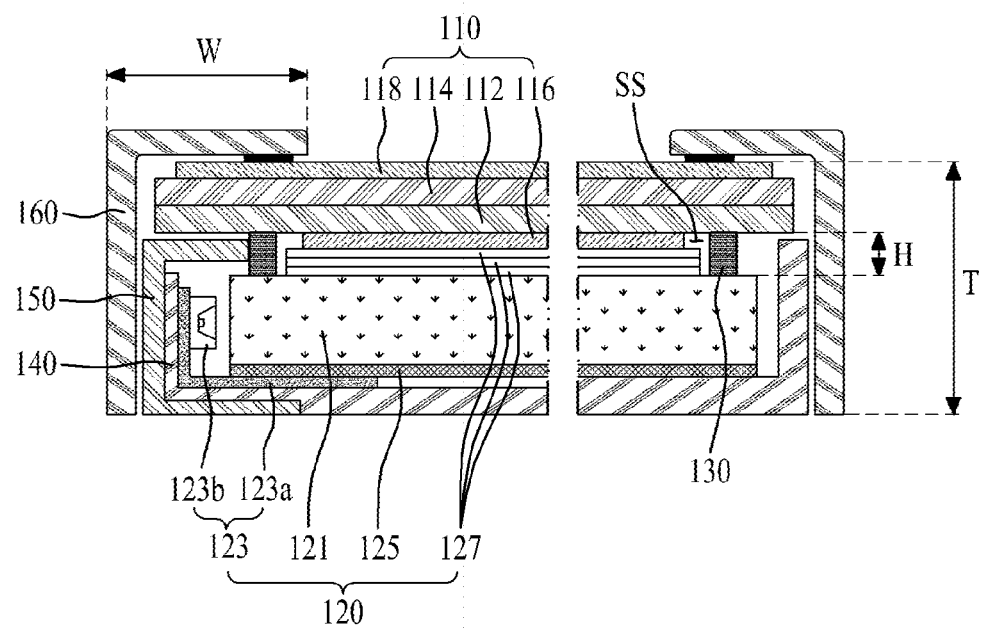
FIG. 4 is a cross-sectional view for describing an LCD device according to a first embodiment of the present invention.

FIG. 4 is a cross-sectional view for describing an LCD device according to a first embodiment of the present invention. Referring to FIG. 4, the LCD device according to the first embodiment of the present invention includes a liquid crystal display panel 110, a backlight unit 120, a coupling member 130, a lower case 140, a light source case 150, and an upper case 160.

The liquid crystal display panel 110 adjusts a transmittance of light irradiated from the backlight unit 120, thereby displaying a certain image. To this end, the liquid crystal display panel 110 includes a lower substrate 112, an upper substrate 114, a lower polarizing member 116, and an upper film member 118.

The lower substrate 112 includes a plurality of pixels (not shown) which are respectively formed in a plurality of areas defined by intersections between a plurality of gate lines (not shown) and a plurality of data lines (not shown).

Each of the plurality of pixels may include a thin film transistor (TFT, not shown) that is connected to a corresponding gate line and a corresponding data line, a pixel electrode that is connected to the TFT, and a common electrode that is formed adjacent to the pixel electrode to receive a common voltage. The lower substrate 112 generates an electric field corresponding to a difference voltage between the common voltage and a data voltage applied to each pixel, thereby adjusting a light transmittance of a liquid crystal layer.

The upper substrate 114 includes a plurality of color filters respectively corresponding to the plurality of pixels which are formed at the lower substrate 112, and is coupled to the lower substrate 112 to face each other with the liquid crystal layer therebetween. A common electrode, which receives the common voltage, may be formed at the upper substrate 114 depending on a driving mode of the liquid crystal layer. The upper substrate 114 filters, by using the color filters, light incident through the liquid crystal layer to emit color light to the outside, thereby enabling the liquid crystal display panel 110 to display a certain color image.

The lower substrate 112 and the upper substrate 114 may be provided as various types known to those skilled in the art depending on a twisted nematic (TN) mode, a vertical alignment (VA) mode, an in-plane switching (IPS) mode, and a fringe field switching (FFS) mode.

The lower polarizing member 116 is adhered to a bottom of the lower substrate 112, and polarizes light incident from the backlight unit 120 to irradiate the polarized light on the lower substrate 112.

The upper film member 118 may include an upper polarizing member that is adhered to a top of the upper substrate 112, and polarizes light which is emitted to the outside through the upper substrate 114.

The upper film member 118 may include the upper polarizing member and a three-dimensional (3D) image optical member (not shown) that is disposed on the upper polarizing member. In this case, the liquid crystal display panel 110 temporally or spatially divides and displays a left image and a right image depending on a display type of a 3D image, and the 3D image optical member separates the left image and the right image to provide the separated images to a viewer. Here, the 3D image optical member is adhered to a top of the upper polarizing member, and may include a retarder film that provides a 3D image based on a polarizing type to a viewer and a lens film that provides a 3D image based on a glasses-free type to a viewer.

The backlight unit 120 is disposed under the liquid crystal display panel 110, and irradiates light onto the bottom of the liquid crystal display panel 110. To this end, the backlight unit 120 includes a light guide plate 121, a light source module 123, a reflective sheet 125, and an optical sheet 127.

The light guide plate 121 is provided in a flat (or wedge) shape to have at least one light input part that is provided in at least one side surface of the light guide plate 121. The light guide plate 121 guides light, which is incident through the light input part from the light source module 123, toward the liquid crystal display panel 110.

The light source module 123 is disposed to face the light input part of the light guide plate 121, and irradiates light on the light guide plate 121. To this end, the light source module 123 includes an LED array board 123a and a plurality of LED packages 123b.

The LED array board 123a is a flexible printed circuit board (FPCB) having a flexibility. The LED array board 123a may be bent in L-shape, and adhered to the lower case 140 by an adhesive member to surround the light input part of the light guide plate 121 and a bottom edge portion of the light input part. A plurality of driving power lines that respectively supply driving power to the plurality of LED packages 123b are formed at the LED array board 123a, and are connected to a backlight driving circuit (not shown) through a corresponding signal cable (not shown).

The plurality of LED packages 123b face the light input part of the light guide plate 121, and are mounted on the LED array board 123a to be separated from each other at certain intervals. The plurality of LED packages 123b emit light with the driving power supplied from the respective driving power lines of the LED array board 123a to irradiate the light having certain luminance onto the light input part of the light guide plate 121. The light emitted from the plurality of LED packages 123b is incident on the light input part of the light guide plate 121, is reflected from and refracted inside the light guide plate 121, and is irradiated onto the bottom of the liquid crystal display panel 10 through the plurality of optical sheets 127.

The reflective sheet 125 is disposed at a bottom of the light guide plate 121, and reflects light, which is incident through the bottom of the light guide plate 121, toward the liquid crystal display panel 110. An edge portion of the reflective sheet 125 may be bent to surround a side surface other than the light input part of the light guide plate 121.

The optical sheet 127 is disposed on the light guide plate 121, and enhances a luminance characteristic of light traveling from the light guide plate 121 to the liquid crystal display panel 110. To this end, the optical sheet 127 may include at least one diffusive sheet and prism sheet.

The coupling member 130 couples the liquid crystal display panel 110 to the light guide plate 121 to face each other with the optical sheet 127 therebetween, in order for a sealed space SS to be provided between the liquid crystal display panel 110 and the light guide plate 121. That is, the coupling member 130 is provided at a top of the light guide plate 121 to surround all side surfaces of the optical sheet 127 and the lower polarizing member 116 of the liquid crystal display panel 110, and is adhered to the lower substrate 112 of the liquid crystal display panel 110. In this case, a height H of the coupling member 130 may be the same as a total height of the optical sheet 127 and a height of the lower polarizing member 116 of the liquid crystal display panel 110, but is not limited thereto. That is, the coupling member 130 can be compressed (or contracted) by a load of the liquid crystal display panel 110, and thus, the height H of the coupling member 130 may be formed higher than a total height of the optical sheet 127 and the lower polarizing member 116 by an amount of compression by the load of the liquid crystal display panel 110. Therefore, the liquid crystal display panel 110 may be coupled to the light guide plate 121 by the coupling member 130, and the lower polarizing member 116 of the liquid crystal display panel 110 may be disposed in the sealed space SS to surface-contact an entire area of a top of the optical sheet 127, or disposed at the top of the optical sheet 127 to have a process gap which is dependent on a compression amount of the coupling member 130.

Figure 5:
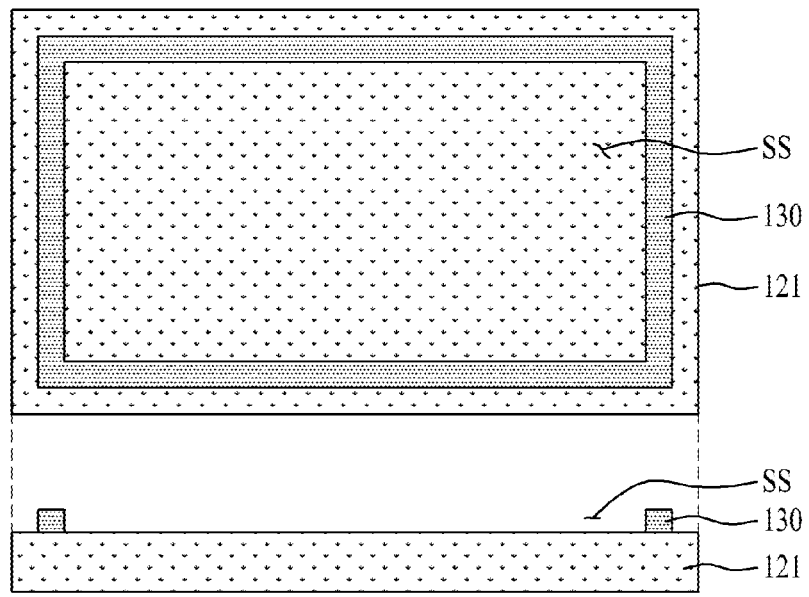
FIG. 5 is a plane view and a side view for describing a light guide plate and a coupling member of FIG. 4.

The coupling member 130, as illustrated in FIG. 5, is formed at a top edge portion of the light guide plate 121 to have a certain height and width, and defines the sealed space SS, in which the optical sheet 127 is provided, on the light guide plate 121. Here, the coupling member 130 may be formed of one of a double-sided tape, an adhesive resin, and an adhesive pad.

The lower case 140 is provided in a box shape to have an accommodating space that accommodates the backlight unit 120.

The light source case 150 is coupled to one side of the lower case 140 adjacent the light source module 123, and covers the light input part of the light guide plate 121 and a top of the light source module 123 facing the liquid crystal display panel 110. That is, the light source module 150 may be provided in a ⊂-shape to include: a first horizontal part that is disposed between the light source module 123 and the liquid crystal display panel 110, and covers the light input part of the light guide plate 121 and the top of the light source module 123; a vertical part that is bent vertically from the first horizontal part to surround a side surface of the lower case 140; and a second horizontal part that is bent in parallel with the first horizontal part to surround one side edge portion of a bottom of the lower case 140.

The upper case 160 is provided in a tetragonal band shape to have a cross-sectional surface having a ⌐-shape, and surrounds a top edge portion of the liquid crystal display panel 110, the side surface of the lower case 140, and all side surfaces of the light source case 150. In this case, the upper case 160 may be coupled to the light source case 150 and the side surface of the lower case 140 by a side coupling scheme using a screw, or may be coupled to the light source case 150 and the side surface of the lower case 140 by a hook coupling scheme in addition to the screw without being limited thereto.

A process of manufacturing the LCD device according to the first embodiment of the present invention will now be described.

First, the coupling member 130 is provided at the top edge portion of the light guide plate 121.

Subsequently, the optical sheet 127 is disposed in an optical sheet disposing area of the light guide plate 121 surrounded by the coupling member 130.

Subsequently, the light guide plate 121 and the liquid crystal display panel 110 are coupled to each other by the coupling member 130 with the optical sheet 127 therebetween. Therefore, the sealed space SS is provided between the light guide plate 121 and the liquid crystal display panel 110, and the lower polarizing member 116 of the liquid crystal display panel 110 is disposed to surface-contact the top of the optical sheet 127, or disposed on the optical sheet 127 to be separated from the optical sheet 127 by a process gap.

Subsequently, the reflective sheet 125 and the light source module 123 are disposed at the lower case 140, and then the light guide plate 121 and the liquid crystal display panel 110 which are coupled to face each other by the coupling member 130 are disposed on the reflective sheet 125.

Subsequently, the light source case 150 is assembled to the lower case 140.

Subsequently, the upper case 160 is assembled to the lower case 140 and the light source case 150, and surrounds the top edge portion of the liquid crystal display panel 110, the side surface of the lower case 140, and all side surfaces of the light source case 150.

As described above, since the sealed space SS is formed between the light guide plate 121 and the liquid crystal display panel 110 by the coupling member 130 and the optical sheet 127 is disposed in the sealed space SS, the LCD device according to the first embodiment of the present invention can prevent a deviation and dislocation of the optical sheet 127 and interference between elements when testing for a mechanical reliability, for example, a vibration and an impact. Also, penetration of a foreign material and moisture is fundamentally prevented by the sealed space SS, and thus, the LCD device according to the first embodiment of the present invention can prevent the optical sheet 127 from being creased due to penetration of the foreign material and the moisture, and particularly prevent mura from occurring at an environment of high temperature and humidity. Also, since the light guide panel 121 and the liquid crystal display panel 110 are coupled to face each other by the coupling member 130, a guide panel for supporting the liquid crystal display panel 110 can be removed from the LCD device, thus reducing a thickness T and bezel width W of the LCD device.

As a result, the LCD device according to the first embodiment of the present invention can prevent mura from occurring at an environment of high temperature and humidity, and have a thin thickness T and a narrow bezel width W.

Figure 6:
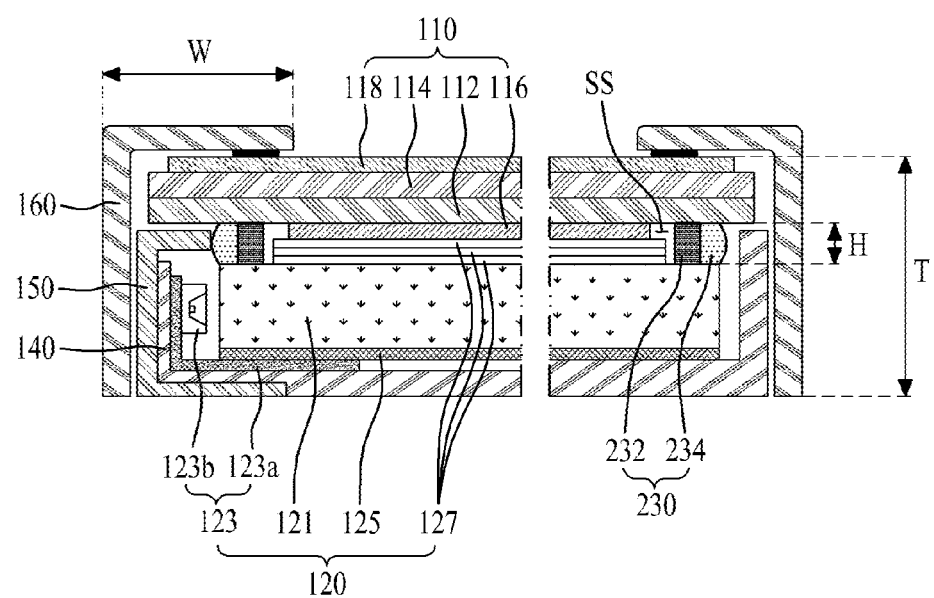
FIG. 6 is a cross-sectional view for describing an LCD device according to a second embodiment of the present invention.

FIG. 6 is a cross-sectional view for describing an LCD device according to a second embodiment of the present invention, and is configured by changing a structure of the coupling member. Hereinafter, only a configuration of the coupling member will be described.

As seen in FIG. 6, a coupling member 230 of the LCD device according to the second embodiment of the present invention may include a bank 232 and a sealing member 234.

The bank 232 is continuously provided to have a certain width at the top of light guide plate 121 separated from each of the side surfaces of the light guide plate 121, and defines the sealed space SS between the liquid crystal display panel 110 and the light guide plate 121. The bank 232 may contact the lower substrate 112 of the liquid crystal display panel 110, or may be formed of a resin member or a pad member at the top of the light guide plate 121 to have a certain gap, but is not limited thereto. For example, the bank 232 may be formed identical to the coupling member 130 according to the first embodiment of the present invention.

The sealing member 234 is for sealing an outer portion of the bank 232, and is charged into a facing space between the liquid crystal display panel 110 and the top edge portion of the light guide plate 121 provided along the outer portion of the bank 232 to couple the liquid crystal display panel 110 to the light guide plate 121 and seal the sealed space SS provided by the bank 232. Here, the bank 232 prevents the sealing member 234 charged into the facing space from penetrating into the sealed space SS.

The sealing member 234 may be formed of a photocurable sealing material that is charged into the facing space by a dispensing method or a jetting method and hardened. For example, the sealing member 234 may be formed an ultraviolet (UV) hardening material so as to enhance a productivity.

The sealing member 234 is formed by a sealing member formation means (not shown), which includes: a spray nozzle (not shown) that charges a sealing material into the facing space; a first light irradiating nozzle (not shown) that is disposed at one side of the spray nozzle, and irradiates light on the sealing material, which is charged into the facing space by the spray nozzle, to primarily harden the sealing material; and a second light irradiating nozzle (not shown) that is disposed at one side of the first light irradiation nozzle, and irradiates light on the primarily hardened sealing material to fully harden the sealing material to form the sealing member 234. The spray nozzle and the first and second light irradiating nozzles may be supported by a nozzle supporting means (not shown), and may form the sealing member 234 while moving along the outer portion of the bank 232 according to a movement of the nozzle supporting means. Here, the second light irradiating nozzle may not be provided depending on a hardening time of the sealing material and a manufacturing process time of the sealing member 234.

FIGS. 7A to 7D are views for describing a process of manufacturing the LCD device according to the second embodiment of the present invention. The process of manufacturing the LCD device according to the second embodiment of the present invention will now be described with reference to FIGS. 6 through 7D.

Figure 7A:
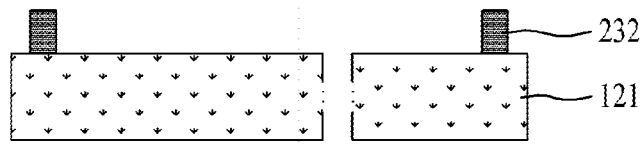
FIGS. 7A to 7D are views for describing a process of manufacturing the LCD device according to the second embodiment of the present invention.

First, as illustrated in FIG. 7A, the bank 232 which is continuous to have a certain width is provided at the top of the light guide plate 121 separated from each side surface of the light guide plate 121.

Figure 7B:
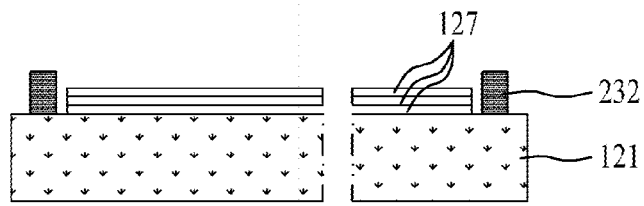

Subsequently, as illustrated in FIG. 7B, the optical sheet 127 is disposed on the light guide plate 121 surrounded by the bank 232.

Figure 7C:
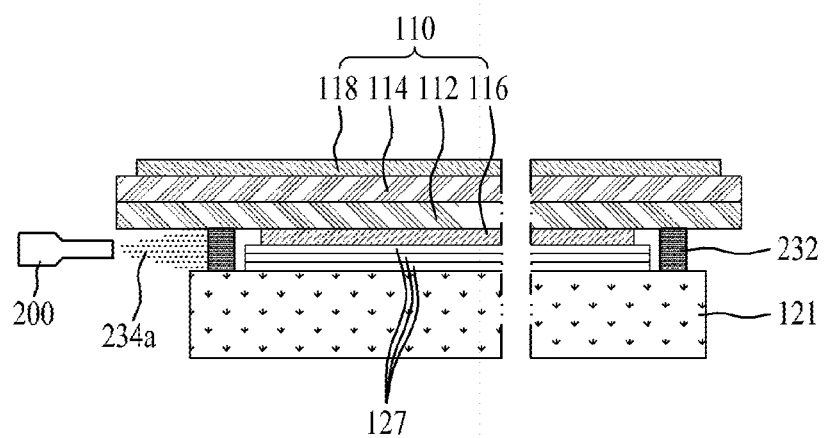

Subsequently, as illustrated in FIG. 7C, the liquid crystal display panel 110 is disposed on the light guide plate 121 in which the bank 232 is provided and the optical sheet 127 is disposed. In this case, the lower polarizing member 116 of the liquid crystal display panel 110 may be disposed at the top of the optical sheet 127 to surface-contact the optical sheet 127, or may be disposed on the optical sheet 127 to be separated from each other by the process gap.

Figure 7D:
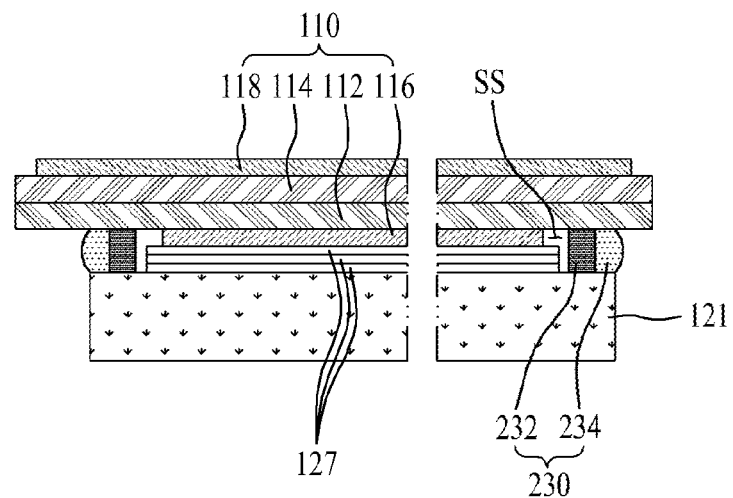

Subsequently, a sealing member formation means 200 charges a sealing material 234a into the outer portion of the bank 232 while moving along the outer portion of the bank 232, and hardens the sealing material 234a. Therefore, as illustrated in FIG. 7D, the sealing member formation means 200 forms the sealing member 234 that seals the facing space which is formed between the top edge portion of the light guide plate 121 and the liquid crystal display panel 110 by the outer portion of the bank 232, and simultaneously couples the liquid crystal display panel 110 to the light guide plate 121. Accordingly, the sealed space SS which is defined by the bank 232 and sealed by the sealing member 234 is formed between the liquid crystal display panel 110 and the light guide plate 121.

Subsequently, as illustrated in FIG. 6, the reflective sheet 125 and the light source module 123 are disposed at the lower case 140, and the liquid crystal display panel 110 and the light guide plate 121 which are coupled to face each other by the coupling member 130 are disposed on the reflective sheet 125.

Subsequently, the light source case 150 is assembled to the lower case 140.

Subsequently, the upper case 160 is assembled to the lower case 140 and the light source case 150, and surrounds the top edge portion of the liquid crystal display panel 110, the side surface of the lower case 140, and all side surfaces of the light source case 150.

Figure 8:
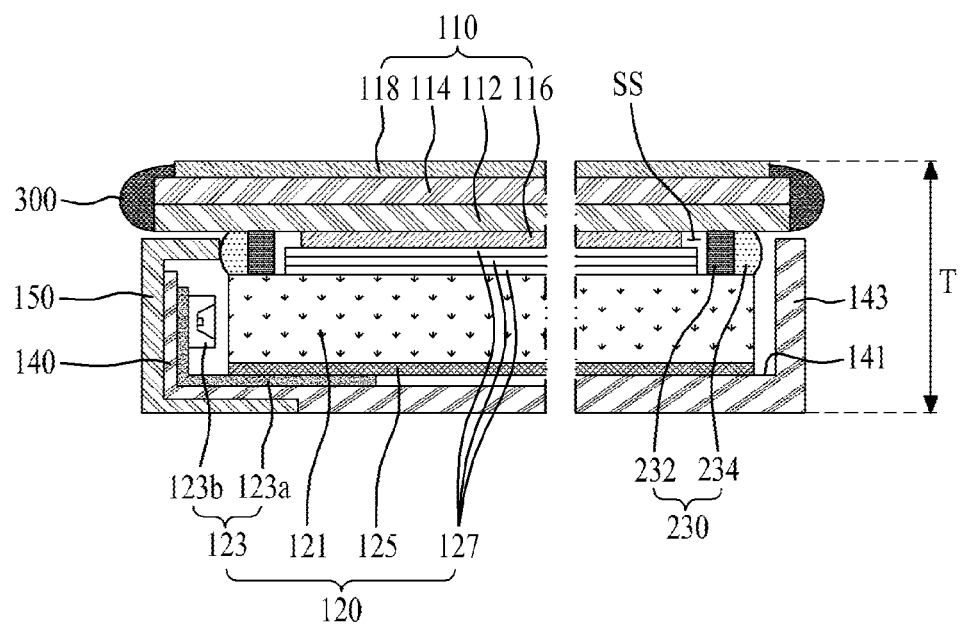
FIG. 8 is a cross-sectional view for describing an LCD device according to a third embodiment of the present invention.

FIG. 8 is a cross-sectional view for describing an LCD device according to a third embodiment of the present invention.

Referring to FIG. 8, the LCD device according to the third embodiment of the present invention includes a liquid crystal display panel 110, a backlight unit 120, a coupling member 130, a lower case 140, a light source case 150, and a panel edge protecting member 300. The LCD device according to the third embodiment of the present invention additionally includes the panel edge protecting member 300, and does not include the upper case of the LCD device of FIG. 4 or 6. Thus, only different elements will be described below.

The panel edge protecting member 300 is provided at a side surface of the liquid crystal display panel 110 to have a certain thickness, and surrounds an edge portion of the liquid crystal display panel 110. The panel edge protecting member 300 is provided to surround, except one side edge portion of a long side of a lower substrate 112 connected to a panel driving circuit (not shown) of the liquid crystal display panel 110, the other side edge portion of the long side and both side edge portions of a short side of the liquid crystal display panel 110. That is, the panel edge protecting member 300 may be provided to surround a side surface of the lower substrate 112, a side surface of an upper substrate 114, upper and lower corner portions of the lower substrate 112 and upper substrate 114 contacting the side surfaces, and a side surface of an upper polarizing member 118.

A plane area of the display panel 110 is equal to a plane area of outer dimension of the lower case 140. The panel edge protecting member 300 may be formed of a silicon-based or UV hardening-based sealant (or resin), but considering a process tack time, the panel edge protecting member 300 may be formed of the UV hardening-based sealant. Also, the panel edge protecting member 300 may have a color (for example, blue, red, bluish green, or black), but the color of the panel edge protecting member 300 may be selected depending on a design without being limited thereto. The panel edge protecting member 300 may be formed of a colored resin or a light blocking resin so as to prevent a side light leakage of the liquid crystal display panel 110 due to a total internal reflection of the lower substrate 112.

An entire top and a side surface of the liquid crystal display panel 110 with the panel edge protecting member 300 provided therein are exposed to the outside of the liquid crystal display panel 110 without being surrounded by the lower case 140 and the upper case 150. Therefore, a front surface of the liquid crystal display panel 110 has a fully flat shape with no step height, and since an instrument (the upper case or a bezel) configuring a front border portion of the liquid crystal display panel 110 and a front step height formed by the instrument are all removed from the LCD device, the LCD device has an enhanced aesthetic appearance in terms of a design. Especially, since any instrument is not provided at a front surface of the liquid crystal display panel 110, a degree of immersion of a user (or a viewer) in a screen can be enhanced in displaying an image.

The lower case 140 is disposed under the liquid crystal display panel 110 to accommodate and support the backlight unit 120, but does not surround a side surface of the liquid crystal display panel 110. To this end, the lower case 140 includes a supporting part 141 that supports the backlight unit 120 and a side wall part 143 that is bent from the supporting part 141 to a bottom of the liquid crystal display panel 110, and surrounds a side surface of the backlight unit 120 and a side surface of the coupling member 230.

A top of the side wall part 143 is disposed under the panel edge protecting member 300 such that the entire top and the side surface of the liquid crystal display panel 110 with the panel edge protecting member 300 provided therein are exposed to the outside of the LCD device.

The light source case 150 is coupled to the lower case 140 such that the entire top and the side surface of the liquid crystal display panel 110 with the panel edge protecting member 300 provided therein are exposed to the outside of the LCD device and cover the light source module 123.

In FIG. 8, the coupling member 230 is illustrated as including the bank 232 and the sealing member 234, but is not limited thereto. For example, the coupling member 230 may be formed identically to the coupling member 130 of FIG. 4.

As described above, the LCD device according to the third embodiment of the present invention provides the same effects as those of the LCD device according to the first or second embodiment of the present invention which has been described above by using the coupling member 230, and moreover, by omitting the upper case, the LCD device according to the third embodiment of the present invention can realize zero-bezel. Also, the LCD device according to the third embodiment of the present invention can protect the externally exposed edge portion of the liquid crystal display panel 110 from an impact by using the panel edge protecting member 300, and prevent the side light leakage.

Figure 9:
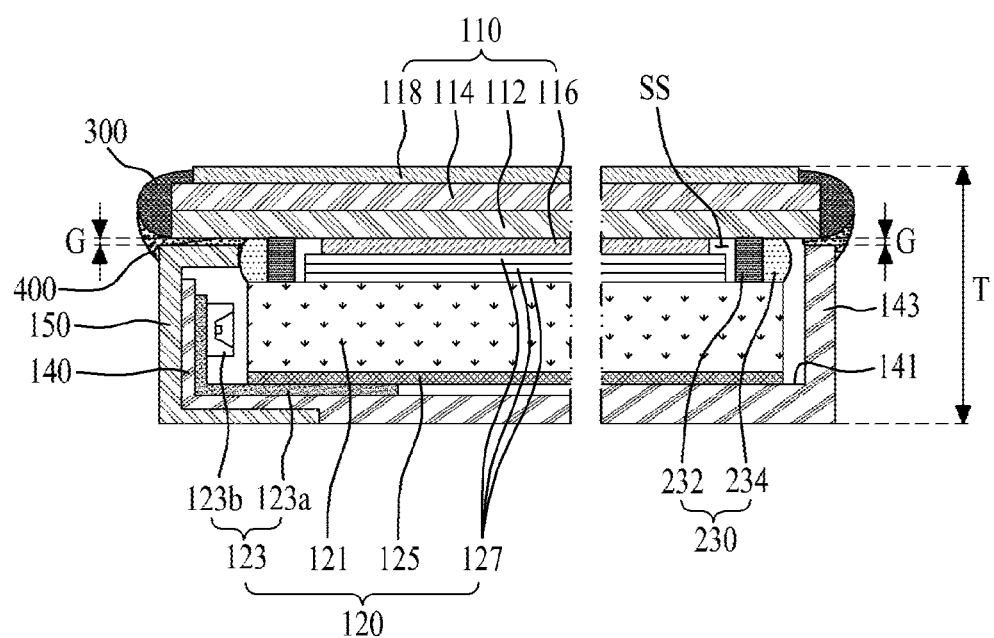
FIG. 9 is a cross-sectional view for describing an LCD device according to a fourth embodiment of the present invention.

FIG. 9 is a cross-sectional view for describing an LCD device according to a fourth embodiment of the present invention.

Referring to FIG. 9, the LCD device according to the fourth embodiment of the present invention includes a liquid crystal display panel 110, a backlight unit 120, a coupling member 130, a lower case 140, a light source case 150, a panel edge protecting member 300, and a gap sealing member 400. Except that the LCD device according to the fourth embodiment of the present invention additionally includes the gap sealing member 400, the LCD device according to the fourth embodiment of the present invention is the same as the LCD device according to the third embodiment of the present invention, and thus, only the gap sealing member will be described below.

The gap sealing member 400 seals a gap G between the panel edge protecting member 300 and a side wall part 143 of the upper case 140, and also seals a gap G between the panel edge protecting member 300 and the light source case 150. The gap sealing member 400 may be formed of the same material as that of the panel edge protecting member 300, and may be charged into and hardened in the gap G by the same process to couple the panel edge protecting member 300 to the lower case 140 and the light source case 150.

In this way, by sealing the gap G, the gap sealing member 400 can prevent a foreign material and moisture from penetrating into the LCD device, and reduce deformation such as a bending or twist of the LCD device caused to an external force, thus enhancing a rigidity of the LCD device by removing the upper case.

As described above, since the optical sheet is disposed in a sealed space that is formed between the light guide plate and the liquid crystal display panel, the present invention can prevent a deviation and dislocation of the optical sheet and interference between elements when testing for a mechanical reliability, for example, a vibration and an impact. Also, penetration of a foreign material and moisture is fundamentally prevented by the sealed space, and thus, the present invention can prevent the optical sheet from being creased due to penetration of the foreign material and the moisture, and particularly prevent mura from occurring at an environment of high temperature and humidity.

Moreover, since the light guide panel and the liquid crystal display panel are coupled to face each other, an instrument such as the guide panel for supporting the liquid crystal display panel can be removed from the LCD device, thus reducing the thickness and bezel width of the LCD device.

Moreover, since the upper case disposed at the front surface of the LCD device is not provided, the present invention can provide a zero-bezel LCD device, protect the edge portion of the liquid crystal display panel exposed to the outside by using the panel edge protecting member, and prevent a side light leakage of the LCD device.

Moreover, since the gap sealing member is provided in the gap between the panel edge protecting member and the case, the gap sealing member can prevent a foreign material and moisture from penetrating into the LCD device, and reduce deformation such as a bending or twist of the LCD device caused to an external force, thus enhancing a rigidity of the LCD device by removing the upper case.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a liquid crystal display panel including an upper substrate and a lower substrate;
   a backlight unit including a light source module, a light guide plate receiving light from the light source module, and an optical sheet disposed on the light guide plate, the light guide plate having an edge portion which does not overlap with the optical sheet; and
   a coupling member configured to couple the lower substrate to the edge portion of the light guide plate such that the optical sheet is disposed in a sealed space defined by the lower substrate, the light guide plate, and the coupling member,
   wherein the liquid crystal display panel further includes a lower polarizing member adhered to the lower substrate in the sealed space, and the lower polarizing member in contact with an entire surface area of a top of the optical sheet in the sealed space.

2. The liquid crystal display device of claim 1, further comprising a panel edge protecting member covering edge portions of the upper and lower substrates.

3. The liquid crystal display device of claim 2, wherein the panel edge protecting member is in direct contact with the edge portions of the upper and lower substrates.

4. The liquid crystal display device of claim 3, wherein the liquid crystal display panel further includes an upper polarizing member adhered to the upper substrate, and the panel edge protecting member is in direct contact with an edge portion of the upper polarizing member.

5. The liquid crystal display device of claim 2, further comprising a lower case accommodating the backlight unit.

6. The liquid crystal display device of claim 5, wherein the lower case surrounds at least a portion of the coupling member.

7. The liquid crystal display device of claim 5, further comprising a gap sealing member between the panel edge protecting member and the lower case.

8. The liquid crystal display device of claim 5, further comprising a light source case coupled to the lower case, wherein a portion of the light source case is disposed between the lower substrate and the light source module.

9. The liquid crystal display device of claim 8, wherein the light source case surrounds at least a portion of the coupling member.

10. The liquid crystal display device of claim 9, further comprising a gap sealing member between the panel edge protecting member and the light source case.

11. The liquid crystal display device of claim 2, further comprising:
    a lower case accommodating the backlight unit;
    a light source case coupled to the lower case, wherein a portion of the light source case is disposed between the lower substrate and the light source module; and
    a gap sealing member, wherein a first portion of the gap sealing member is disposed between the panel edge protecting member and the lower case, and a second portion of the gap sealing member is disposed between the panel edge protecting member and the light source case.

12. The liquid crystal display device of claim 1, further comprising:
    a lower case accommodating the backlight unit;
    a light source case coupled to the lower case, wherein a portion of the light source case is disposed between the lower substrate and the light source module; and
    an upper case surrounding the liquid crystal display panel, the lower case, and the light source case.

13. The liquid crystal display device of claim 12, wherein a portion of the upper case covers a top edge portion of the liquid crystal display panel.

14. The liquid crystal display device of claim 12, wherein the lower case surrounds at least a portion of the coupling member.

15. The liquid crystal display device of claim 12, wherein the light source case surrounds at least a portion of the coupling member.

16. The liquid crystal display device of claim 1, wherein the coupling member includes:
    a bank having a first side surface facing the sealed space and a second side surface opposite to the first side surface; and
    a sealing member contacting the second side surface of the bank.

17. The liquid crystal display device of claim 1, wherein the sealing member is formed of a photocurable material.

* * * * *